(12) United States Patent
Nourse et al.

(10) Patent No.: US 8,711,181 B1
(45) Date of Patent: Apr. 29, 2014

(54) PRE-FETCHING MAP DATA USING VARIABLE MAP TILE RADIUS

(75) Inventors: Thomas Gregory Nourse, Half Moon Bay, CA (US); Michael Siliski, San Francisco, CA (US); Hans-Olav CaveLie, San Francisco, CA (US); Ronghui Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 13/297,720

(22) Filed: Nov. 16, 2011

(51) Int. Cl.
*G09G 5/00* (2006.01)

(52) U.S. Cl.
USPC .......................................... 345/660; 345/667

(58) Field of Classification Search
USPC ................................................ 345/660, 667
See application file for complete search history.

(56) References Cited

U.S. PATENT DOCUMENTS

| | | | |
|---|---|---|---|
| 4,984,279 A | 1/1991 | Kidney et al. | |
| 5,345,086 A | 9/1994 | Bertram | |
| 5,793,310 A | 8/1998 | Watanabe et al. | |
| 5,848,373 A * | 12/1998 | DeLorme et al. | 701/455 |
| 6,094,685 A | 7/2000 | Greenberg et al. | |
| 6,199,150 B1 | 3/2001 | Yoshikawa | |
| 6,330,453 B1 | 12/2001 | Suzuki et al. | |
| 6,400,690 B1 | 6/2002 | Liu et al. | |
| 6,442,757 B1 | 8/2002 | Hancock et al. | |
| 6,453,233 B1 | 9/2002 | Kato | |
| 6,571,279 B1 | 5/2003 | Herz et al. | |
| 6,853,911 B1 | 2/2005 | Sakarya | |
| 7,006,820 B1 | 2/2006 | Parker et al. | |
| 7,136,748 B2 | 11/2006 | Umezu et al. | |
| 7,263,368 B2 | 8/2007 | Knauerhase et al. | |
| 7,315,259 B2 | 1/2008 | Sacks | |
| 7,327,349 B2 | 2/2008 | Robbins et al. | |
| 7,464,109 B2 | 12/2008 | Modi | |
| 7,502,780 B2 | 3/2009 | Thorpe | |
| 7,502,876 B1 | 3/2009 | Nemirovsky et al. | |

(Continued)

FOREIGN PATENT DOCUMENTS

| | | |
|---|---|---|
| KR | 10-2008-071228 | 8/2008 |
| WO | WO-98/28714 A1 | 7/1998 |
| WO | WO-2009/027161 A1 | 3/2009 |

OTHER PUBLICATIONS

Kirchner et al. "A Location-aware Prefetchting Mechanism," Project work at Distributed Information Systems Laboratory LSIR (2004).

(Continued)

*Primary Examiner* — M Good Johnson
(74) *Attorney, Agent, or Firm* — Marshall, Gerstein & Borun LLP

(57) ABSTRACT

A pre-fetching map data system and method identifies a subset of map data to corresponding to one or more points of interest to be displayed on the map. The map data is stored on a remote map database and in the form of map data tiles. The system identifies those map data tiles that correspond to the subset of map data corresponding to the one or more points of interest, where the identified pre-fetch map data tiles are sent from the remote database to a client device for cache storage. The pre-fetch map data tiles are identified using a variable map tile radius, which when extended from the points of interest defines the map tiles that qualify as pre-fetch map data tiles. The tile radius can be fixed or dynamically adjusted and changes across different map zoom levels.

22 Claims, 12 Drawing Sheets

(56) References Cited

U.S. PATENT DOCUMENTS

| | | | |
|---|---|---|---|
| 7,551,182 B2 | 6/2009 | Bethune et al. | |
| 7,571,422 B2 | 8/2009 | Adel et al. | |
| 7,577,520 B2 | 8/2009 | Nomura | |
| 7,584,434 B2 | 9/2009 | Okamura | |
| 7,610,147 B2 | 10/2009 | Umezu et al. | |
| 7,663,671 B2 | 2/2010 | Gallagher et al. | |
| 7,710,421 B2 | 5/2010 | Muramatsu | |
| 7,711,473 B2 | 5/2010 | Sekine et al. | |
| 7,734,412 B2 | 6/2010 | Shi et al. | |
| 7,739,037 B2 | 6/2010 | Sumizawa et al. | |
| 7,796,837 B2 | 9/2010 | Lueck | |
| 7,831,383 B2 | 11/2010 | Oohashi | |
| 7,831,387 B2 | 11/2010 | Golding et al. | |
| 7,839,421 B2 | 11/2010 | Bethune et al. | |
| 7,873,465 B2 | 1/2011 | Geelen et al. | |
| 7,920,968 B2 | 4/2011 | Chapin et al. | |
| 7,925,624 B2 | 4/2011 | Vosshall et al. | |
| 7,925,982 B2 | 4/2011 | Parker et al. | |
| 7,962,565 B2 | 6/2011 | Coker | |
| 7,974,959 B2 | 7/2011 | Sawai et al. | |
| 7,975,025 B1 | 7/2011 | Szabo et al. | |
| 7,983,659 B2 | 7/2011 | Shinya | |
| 7,996,445 B2 | 8/2011 | Fair et al. | |
| 8,005,612 B2 | 8/2011 | Asahara et al. | |
| 8,010,407 B1 | 8/2011 | Santoro et al. | |
| 8,014,796 B2 | 9/2011 | Boudreau et al. | |
| 8,032,297 B2 | 10/2011 | Jakobson | |
| 8,060,389 B2 | 11/2011 | Johnson | |
| 8,060,582 B2* | 11/2011 | Bliss et al. | 709/218 |
| 8,078,641 B2 | 12/2011 | Mao et al. | |
| 8,095,307 B2 | 1/2012 | Ebert et al. | |
| 8,204,966 B1 | 6/2012 | Mendis et al. | |
| 8,280,414 B1 | 10/2012 | Nourse et al. | |
| 2002/0133491 A1 | 9/2002 | Sim et al. | |
| 2003/0187984 A1 | 10/2003 | Banavar et al. | |
| 2004/0203998 A1 | 10/2004 | Knauerhase et al. | |
| 2004/0220730 A1 | 11/2004 | Chen et al. | |
| 2006/0026170 A1 | 2/2006 | Kreitler et al. | |
| 2006/0067224 A1 | 3/2006 | Ohara | |
| 2006/0069749 A1 | 3/2006 | Herz et al. | |
| 2006/0080032 A1 | 4/2006 | Cooper et al. | |
| 2006/0195256 A1 | 8/2006 | Nakamura et al. | |
| 2006/0277271 A1 | 12/2006 | Morse et al. | |
| 2007/0050128 A1 | 3/2007 | Lee et al. | |
| 2007/0080830 A1 | 4/2007 | Sacks | |
| 2007/0143014 A1 | 6/2007 | Sekine et al. | |
| 2007/0242077 A1 | 10/2007 | Danan | |
| 2007/0273558 A1 | 11/2007 | Smith et al. | |
| 2007/0282915 A1 | 12/2007 | Vosshall et al. | |
| 2008/0071988 A1 | 3/2008 | Schloter et al. | |
| 2008/0082225 A1 | 4/2008 | Barrett | |
| 2008/0102857 A1 | 5/2008 | Kim | |
| 2008/0132249 A1 | 6/2008 | Hamilton | |
| 2008/0177469 A1 | 7/2008 | Geelen et al. | |
| 2008/0192053 A1* | 8/2008 | Howell et al. | 345/427 |
| 2008/0238723 A1 | 10/2008 | Fein et al. | |
| 2008/0270579 A1 | 10/2008 | Herz et al. | |
| 2008/0291205 A1 | 11/2008 | Rasmussen et al. | |
| 2009/0063042 A1 | 3/2009 | Santesson et al. | |
| 2009/0125228 A1 | 5/2009 | Dicke et al. | |
| 2009/0128483 A1 | 5/2009 | Robbins et al. | |
| 2009/0132163 A1 | 5/2009 | Ashley, Jr. et al. | |
| 2009/0153563 A1 | 6/2009 | Tudose | |
| 2009/0182500 A1 | 7/2009 | Dicke | |
| 2009/0198767 A1 | 8/2009 | Jakobson et al. | |
| 2009/0210388 A1* | 8/2009 | Elson et al. | 707/3 |
| 2009/0244095 A1 | 10/2009 | Bowman et al. | |
| 2009/0281718 A1 | 11/2009 | Gibran et al. | |
| 2009/0287750 A1 | 11/2009 | Banavar et al. | |
| 2009/0319177 A1 | 12/2009 | Khosravy et al. | |
| 2009/0319188 A1 | 12/2009 | Otto | |
| 2009/0326810 A1 | 12/2009 | Callaghan et al. | |
| 2010/0020091 A1 | 1/2010 | Rasmussen et al. | |
| 2010/0106397 A1 | 4/2010 | Van Essen | |
| 2010/0106801 A1 | 4/2010 | Bliss et al. | |
| 2010/0117810 A1 | 5/2010 | Hagiwara et al. | |
| 2010/0131186 A1 | 5/2010 | Geelen et al. | |
| 2010/0153007 A1 | 6/2010 | Crowley | |
| 2010/0179940 A1 | 7/2010 | Gilder et al. | |
| 2010/0250646 A1 | 9/2010 | Dunagan et al. | |
| 2010/0274899 A1 | 10/2010 | Shrivastava et al. | |
| 2010/0321399 A1 | 12/2010 | Ellren et al. | |
| 2010/0333085 A1 | 12/2010 | Criddle et al. | |
| 2011/0054776 A1 | 3/2011 | Petrov et al. | |
| 2011/0093515 A1 | 4/2011 | Albanese | |
| 2011/0095993 A1 | 4/2011 | Zuverink | |
| 2011/0098917 A1 | 4/2011 | LeBeau et al. | |
| 2011/0098918 A1 | 4/2011 | Siliski et al. | |
| 2011/0161875 A1 | 6/2011 | Kankainen | |
| 2011/0213798 A1 | 9/2011 | Osuka et al. | |
| 2011/0276263 A1 | 11/2011 | Shimotani et al. | |
| 2011/0300848 A1 | 12/2011 | Boudreau et al. | |
| 2011/0316854 A1 | 12/2011 | Vandrovec | |
| 2012/0022786 A1 | 1/2012 | Siliski et al. | |
| 2012/0022787 A1 | 1/2012 | LeBeau et al. | |
| 2012/0083995 A1 | 4/2012 | Vorona | |

OTHER PUBLICATIONS

Molina, "Aiming and Guiding Navigation with a Non-visual GPS Application," Department of Design Sciences Faculty of Engineering, Lund University (2010).

Office action for U.S. Appl. No. 13/244,717 dated Nov. 15, 2011.

Office action for U.S. Appl. No. 13/244,764 dated Nov. 28, 2011.

Piras et al., "Compact GML: merging mobile computing and mobile cartography," CRS4, Center for Advanced Studies, Research and Development in Sardinia (2004).

Reichenbacher et al., "The World in Your Pocket—Towards a Mobile Cartography," Proc. of the 20th International Cartographic Conference (2001).

Weber, "Mobile Map Browsers: Anticipated User Interaction for Data Pre-Fetching," Thesis, The University of Maine, (2010).

Google Developers, "Google Maps API," (2012). Retrieved from the Internet on Aug. 31, 2012: URL:https://developers.google.com/maps/.

International Search Report and Written Opinion for Application No. PCT/US2012/051574, dated Feb. 15, 2013.

International Search Report and Written Opinion for Application No. PCT/US2012/051577, dated Feb. 15, 2013.

International Search Report and Written Opinion for Application No. PCT/US2012/065002, dated Mar. 29, 2013.

International Search Report and Written Opinion for Application No. PCT/US2012/065008, dated Mar. 29, 2013.

International Search Report for Application No. PCT/US2012/051564, dated Feb. 18, 2013.

Mapquest, "JavaScript Maps API," (2012). Retrieved from the Internet on Aug. 31, 2012: URL:http://developer.mapquest.com/web/products/featured/javascript.

MSDN, "Get Started Using Bing Maps," (2012). Retrieved from the Internet on Aug. 31, 2012: URL:http://msdn.microsoft.com/en-us/library/dd877180.aspx.

Wiki, "API," (2012). Retrieved from the Internet on Aug. 31, 2012: URL:http://wiki.openstreetmap.org/wiki/API.

* cited by examiner

PRE-FETCHING MAP DATA USING VARIABLE MAP TILE RADIUS

FIELD OF TECHNOLOGY

The present disclosure relates to map data optimization and more specifically to a system and a method to pre-fetch map data from a remote map database.

BACKGROUND

With the widespread use of mobile devices, such as mobile phones, personal data assistants, tablet personal computers, etc., consumer demand for ready access to varied types of data continues to grow at a high rate. These devices are used to transmit, receive, and store text, voice, image, and video data. Consumers often look to store large numbers of applications on these devices, such that mobile devices are often touted more for the number of available applications, than internal processor speed. While consumers have come to desire fast access to data, the sheer amount of data required to run these applications places a premium on data management, both at the device level and at the network level. This premium limits the effectiveness of applications such as mapping applications, which typically require comparatively large amounts of network data.

Mapping applications are found in a variety of mobile devices, including car navigation systems, hand-held GPS units, mobile phones, and portable computers. These applications are among the most frequently used applications and are considered, by some, necessary for modern living. Although the underlying digital maps are easy to use from a user's perspective, creating a digital map is a data intensive process. Every digital map begins with a set of raw data corresponding to millions of streets and intersections. That raw map data is derived from a variety of sources, each providing different amounts and types of information. To effectively map a location, locate a driving route between a source and a destination, identify points of interest, etc. requires substantial amounts of data. Furthermore, many mapping applications require display of different map data at different zoom levels, i.e., different scales, where the amount of detail and that nature of that detail changes at each zoom level. For example, at a lowest zoom level, scaled farthest away from a target, the map data may contain the boundaries of continents, oceans, and major landmasses. At subsequent zoom levels that map data may identify countries, states, homelands, protectorates, other major geographic regions. While at even further subsequent zoom levels, that map data may contain major roads, cities, towns, until eventually the map data contains minor roads, buildings, down to even sidewalks and walk ways depending on the region. The amount of detail is determined by the sources of information used to construct the map data at each zoom level. But no matter the zoom level, the amount of information is voluminous and generally too large for storage, in total, on mobile devices and too large for continuous download over a wireless communication network.

In operation, mapping applications typically download map data to the mobile device through a wireless communication network and in response to a user entering a location of interest and/or based on the current location of the mobile device, such as the current global positioning satellite (GPS) data or current cellular network location data for the device. A conventional technique for downloading map data is to have the mobile device communicate this location data to a remote processor on the wireless communication network, which, in response, downloads all map data to the mobile device or the map data requested for display to the user.

Generally speaking, the map data is stored in blocks known as map data tiles, where the number of map data tiles increases with zoom level. The remote processor provides a subset of the available map data tiles for a particular location or region to the mobile device for storage and display at any particular time via a map display application. By providing large numbers of map data tiles, the mobile device may buffer the map data for display to the consumer as the consumer scrolls across an area using the mapping application looking for adjacent or other mapping locations. However, the larger the number of map tiles provided at any particular time increases the download time and buffer memory usage while the user is using the map display application.

Conventionally, map data tiles are downloaded and cached, but in a crude manner that is unable to take advantage of memory surpluses on devices and unable to take advantage of network bandwidth surpluses, e.g., when the user is not using the device. The conventional techniques are similarly deficient in the face of lacking memory and reduced bandwidth. As a result, there is a need to have more intelligent mechanisms for downloading map data, in particular map data tiles, to sufficiently satisfy the needs of the user, while doing so in a manner that addresses network bandwidth and memory conditions.

SUMMARY

In an embodiment, a computer-implemented method comprises: identifying, on the client device, a map point of interest; identifying, from a plurality of zoom levels, one or more zoom levels for use in identifying map data for storage on the client device, where the map data is to be stored on the client device at different zoom levels, each zoom level containing a respective set of map data tiles; identifying a different tile radius for each of the one or more determined zoom levels, where each tile radius corresponds to the map point of interest and defines, for each of the one or more zoom levels, pre-fetch map data tiles to be requested from a remote map database and stored on the client device for eventual rendering of the visual display in response to a subsequent user request; requesting, from the remote map database, the pre-fetch map data tiles, wherein the map database stores map data in the form of a plurality of map data tiles, and the pre-fetch map data tiles are a sub-set of the plurality of map data tiles; and receiving and storing the pre-fetch map data tiles in a local memory on the client device.

In another embodiment, a computer-readable medium storing instructions, the instructions when executed by a processor cause the processor to: identify, on the client device, a map point of interest; identify, from a plurality of zoom levels, one or more zoom levels for use in identifying map data for storage on the client device, where the map data is to be stored on the client device at different zoom levels, each zoom level containing a respective set of map data tiles; identify a different tile radius for each of the one or more determined zoom levels, where each tile radius corresponds to the map point of interest and defines, for each of the one or more zoom levels, pre-fetch map data tiles to be requested from a remote map database and stored on the client device for eventual rendering of the visual display in response to a subsequent user request; request, from the remote map database, the pre-fetch map data tiles, wherein the map database stores map data in the form of a plurality of map data tiles, and the pre-fetch map data tiles are a sub-set of the plurality of map data tiles; and receive and store the pre-fetch map data tiles in a local memory on the client device.

In another embodiment, a computer system for fetching map tile data to be used in constructing a visual display of map data on a client device, the computer system comprising: a map point identifier module that identifies a map point of interest; a zoom level module that identifies one or more zoom levels for use in identifying map data for storage on the client device, where the map data is to be stored on the client device at different zoom levels, each zoom level containing a respective set of map data tiles; a map tile radius module that determines a different tile radius for each of the one or more determined zoom levels, where each tile radius corresponds to the map point of interest and defines, for each of the one or more zoom levels, pre-fetch map data tiles to be requested from a remote map database and stored on the client device for eventual rendering of the visual display in response to a subsequent user request; and a database interface module to receive, from the map database, the pre-fetch map data tiles corresponding to the map point of interest and to store the pre-fetch map data tiles in a local memory on the client device.

In yet another embodiment, a computer-implemented method for identifying pre-fetch map tile data to be used in constructing a visual display of map data on a client device, the method comprising: receiving, at a server, data identifying one or more map points of interest of map data stored in a map database on the server, where the map data is stored in the map database in a plurality of different zoom levels each comprising a plurality of map data tiles, where at least two of the zoom levels contain different numbers of map data tiles; receiving, at the server, map tile radius data for each of the one or more map points of interest; receiving, at the server, zoom level data identifying one or more zoom levels for each of the one or more map points of interest; collecting, from the map database, pre-fetch map data tiles for each of the one or more map points of interest, based on the received, one or more map points of interest, the map tile radius data, and the zoom level data; and transmitting the pre-fetch map data tiles to the client device for storage on the device.

In some embodiments, the map database contains map data at multiple zoom levels and the tile radius provides a mechanism for identifying pre-fetch map data tiles at each zoom level. In some embodiments, the tile radius changes with zoom level, by increasing with zoom level. In some embodiments, the tile radius at some zoom levels is the same, while in other embodiments, the tile radius is different at each zoom level. In some embodiments, the tile radius for each zoom level is stored in a lookup table accessible during operation.

In some embodiments, the tile radius is fixed; while in other embodiments, the tile radius may be adjusted based on usage patterns of the user of a client device.

In some embodiments, there are a plurality of map points of interest, and the method or system determines tile radii for each, to allow for pre-fetching of map data tiles for each point of interest.

The features and advantages described in this summary and the following detailed description are not all-inclusive. Many additional features and advantages will be apparent to one of ordinary skill in the art in view of the drawings, specification, and claims hereof.

DETAILED DESCRIPTION

The present application describes techniques for fetching map data over a selected subset of the entire map data available, for a particular zoom level, by using a map radius to define map data of interest. That map radius varies with the zoom level to encompass map data covering different geographic regions of interest. In some example implementations, while the map radius at each zoom level varies, increasing with each zoom level, the amount of map data fetched is maintained constant across zoom levels.

More particularly, a map pre-fetch system and method identifies map data corresponding to one or more particular locations of interest, based on a radius of map data surrounding those locations. In an embodiment, a client device employing the pre-fetch system identifies locations of interest to a server, along with data indicating one or more zoom levels at which map data is to be displayed to a user. The server responds by downloading to the client device map data within the determined radius of interest surrounding the identified points. In this way, the client device is able to pre-load, a sufficient amount of map data to allow a user to scroll through the visual display of map data around the locations of interest, without the device having to further poll the server for that information during user interaction. In some embodiments, the radius of interest is made to vary across zoom levels, and generally is determined to allow the user, at each zoom level, an amount of flexibility so that the user can interact with a visual map display, scrolling through the display, without the client device having to frequently access the server for additional map data, as in conventional systems. The map data is stored in a map database at the server in data blocks, termed "tiles." The radius is used to identify a number of tiles of a map data that will be pre-fetched by the server and sent to the client device for buffering and display to the user.

Pre-fetching refers to requesting map data from a remote map database, such as that of a remote server, prior to any specific user request for map data, so that map data may be collected and buffered on a device until a specific user request for map data. In this way, pre-fetching seeks to collect map data in the background, before that map data is called upon to construct a visual display, thereby reducing (and even eliminating) the need for a client device to request map data only after a user request. The pre-fetched map data is automatically identified, requested, and stored on the client device for subsequent use in constructing a visual display. As discussed in examples below, where that map data is stored in the remote map database in the form of map data tiles, the pre-fetching is of map data tiles.

Figure 1:
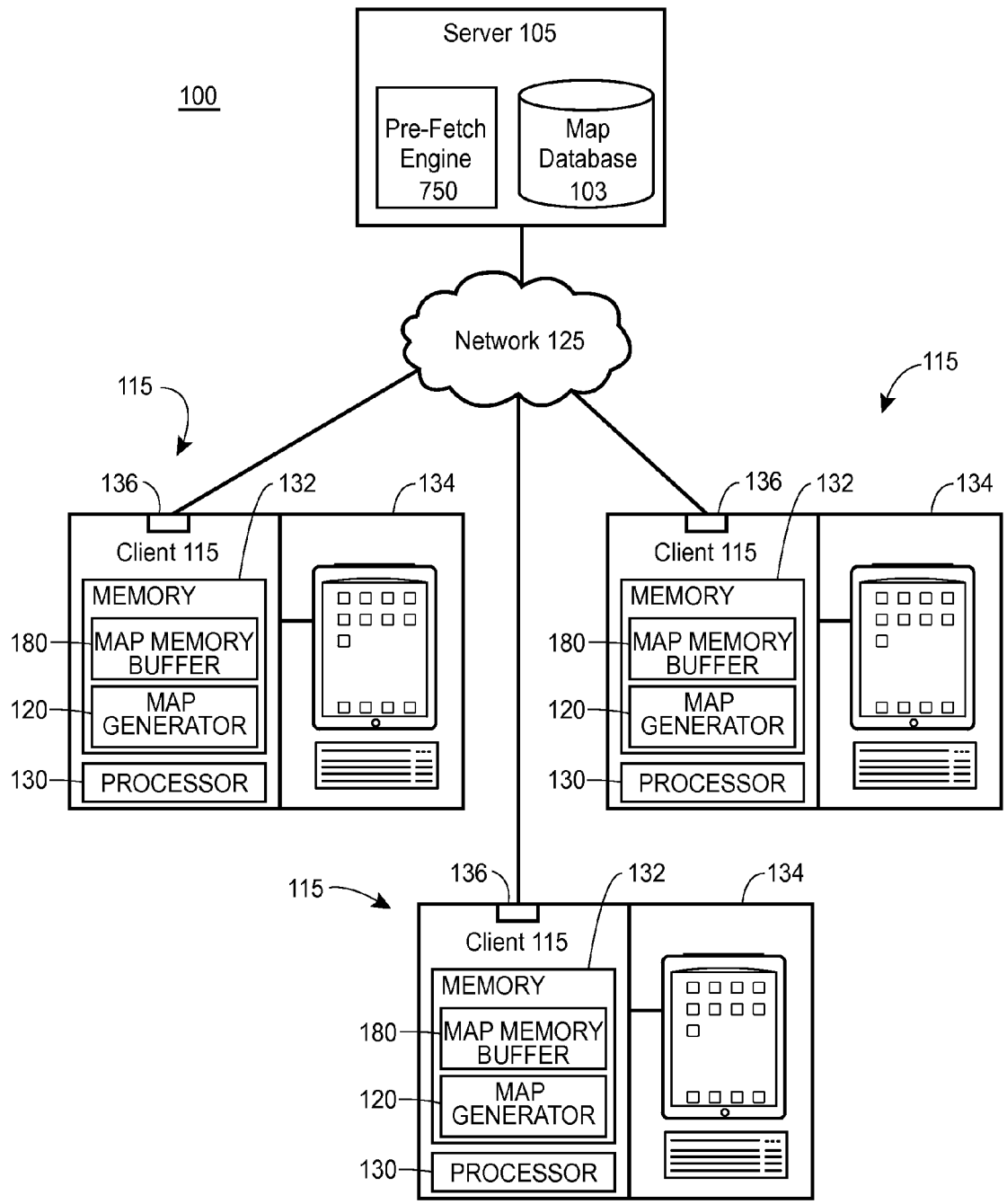
FIG. 1 is high-level block diagram of a wireless network depicting a wireless base station connected to a server containing mapping data for selectively communicating that mapping data to a various client devices on the network.

FIG. 1 is a high-level block diagram that illustrates a computing environment for a pre-fetch map data system 100 that may be used to access and store map data within a map database. As illustrated in FIG. 1, the computing environment includes a map database 103 connected to or disposed within a server 105, which is, in turn, connected to a number of client devices 115 through a network 125. The network 125 includes but is not limited to any combination of a LAN, a MAN, a WAN, a mobile, a wired or wireless network, a private network, or a virtual private network. While only three clients 115 are illustrated in FIG. 1 to simplify and clarify the description, it is understood that any number of client computers are supported and can be in communication with the server 105.

Both the server 105 and the clients 115 are computers that may include a CPU 130 (only shown in the clients), one or more computer readable memories 132, one or more user interfaces 134 (keyboard, touch screen, etc.), a network interface 136, one or more peripheral interfaces, and other well known components. As is known to one skilled in the art, other types of computers can be used that have different architectures. The client devices 115 represent any suitable handheld and/or mobile device, such as a mobile phone, personal data assistant, laptop computer, tablet personal computer, car navigation system, hand-held GPS unit, or "smart" device. More broadly, the client devices 115 represent any personal computing device, database, server, or network of such devices, or any other processing device having a user interface and CPU and capable of displaying a visual rendition of map data accessed from the map database 103 or other remote source of map data. Furthermore, while in some examples, the network 125 is described as a wireless network, the network 125 may be any wired or wireless network, where the clients 115 are devices on the network.

The server 105 and the clients 115 are also adapted to execute computer program modules for providing functionality described herein. As used herein, the terms "module" and "routine" refer to computer program logic used to provide the specified functionality. Thus, a module or a routine can be implemented in hardware, firmware, and/or software. In one embodiment, program modules and routines are stored on a storage device, loaded into memory, and executed by a processor or can be provided from computer program products that are stored in tangible computer-readable storage mediums (e.g. RAM, hard disk, optical/magnetic media, etc.).

The map database 103, which may be stored in or may be separate from the server 105, contains map data that can be used to generate a digital map or that can be used by, for example, a navigation system to determine routes between two locations. Physical roads, waterways, parks, landmarks, and other geographic elements may be represented in the map data by a list of nodes and segments that connect those nodes. Each node corresponds to a specific geographic location in the physical world. The data representation for each node generally includes a set of coordinates (e.g., latitude and longitude) and an association with one or more segments. For roads, each segment corresponds to a section of a physical location that begins at one node and ends at a different node. The data representation for each road segment, for example, can include a length and a number of attributes, such as a street name, a priority (e.g. a highway or a local road), speed information, a surface type, a road width, an indication of whether the road segment is a one-way segment, address ranges, usage (e.g. ramp or trail), etc.

The map data stored in the map database 103 can be obtained from several different sources such as the New York City Open Accessible Space Information System (OASIS) and the U.S. Census Bureau Topologically Integrated Geographic Encoding and Referencing system (TIGER). The map data can also be accessed by one of the map generators 120, modified, and stored back into the database 103. Further, the database 103 does not need to be physically located within server 105. For example, the database 103 can be partially stored within a client 115, can be stored in external storage attached to the server 105, or can be stored in a network attached storage. Additionally, there may be multiple servers 105 that connect to a single database 103. Likewise, the map database 103 may be stored in multiple different or separate physical data storage devices.

Each client 115 executes one of the map generators 120, each of which receives pre-fetch map data from the server 105 and generates a visual display of the received map data that is presented to the user on a display of the interface 134. The map generator 120 is able to adjust that visual display in response to user interactions with the interface 134, for example, adjusting which map data is visualized at any given time in response to a user selecting to scroll (left, right, up, down, etc.) through the visual display, or in response to the user selecting to change the zoom level (e.g., scale) of the displayed map data.

Figure 2:
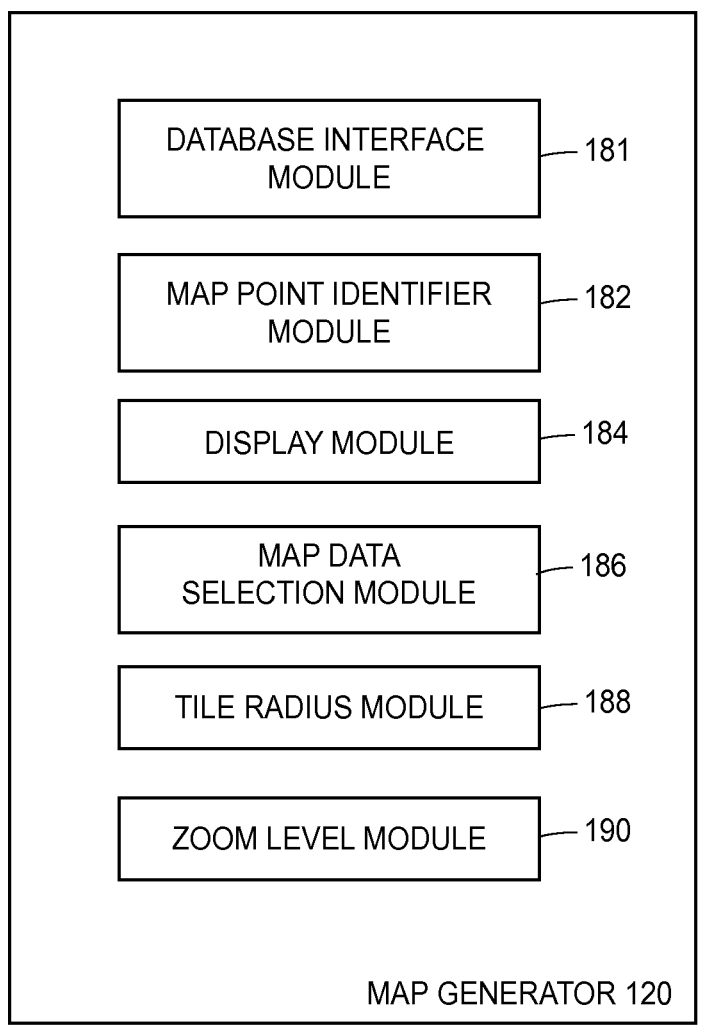
FIG. 2 is a block diagram of an example map generator in the client device of FIG. 1.

As illustrated in the detailed example of FIG. 2, the client 115 may include various modules within or associated with the map generator 120, including a database interface module 181 that operates to retrieve map data from the server 105 and map database 103. The map generator 120 further includes a map point identifier module 182 capable of identifying one or more points of interest that are to be used by a display module 184 to create a visual map display of received map data on the interface 134. The points of interest are communicated by the interface module 181 through the network interface 136 through network 125 to the server 105, which responds by sending pre-fetch map data from the map database 103 back to the client device 115, where this pre-fetch map data is received by the database interface module 181 and stored in a map buffer memory 180 of the client 115. A map data selection module 186 accesses the stored pre-fetch map data and determines which portion of that locally-stored map data is to be provided to the display module 184 for creating the visual map display on the interface 134. The module 186, therefore, is responsive (after pre-fetching) to user interaction with the interface 134 to determine which portion of the pre-fetched map data the user desires to display on the client 115 at any given time, which desire is determined by a centralized map position, user scrolling, and zoom level.

In the illustrated embodiment, the map generator 120 further includes a map radius module 188 that identifies a radial distance from the one or points of interest to define the bounds of the pre-fetch map data transmitted by the server 105. The client 115, for example, is able to communicate map radius data to the server 105 through the database interface module 181, while the server 105 uses that data to define the bounds of the pre-fetch map data selected from the overall map database 103, which the server 105 then communicates as pre-fetch map data to the client 115 for storage in the buffer 180.

While the map radius module 188 is described as contained within the map generator 120, in other examples, a radius module may be stored in the server 105 or in both the client 115 and the server 105. In embodiments where the map radius module 188 accesses zoom data from a zoom level module 190, the map radius module 188 may access a radius/zoom level look up table that associates a radius for each zoom level. Such a radius module may be implemented in the map generator 120 of the client 115 or implemented as a standalone or integrated module at the server 105.

Of course, some embodiments of the map generator 120 may have different and/or other modules than the ones described herein. Similarly, the functions described herein can be distributed among the modules in accordance with other embodiments in a different manner than that described herein.

Figure 3:
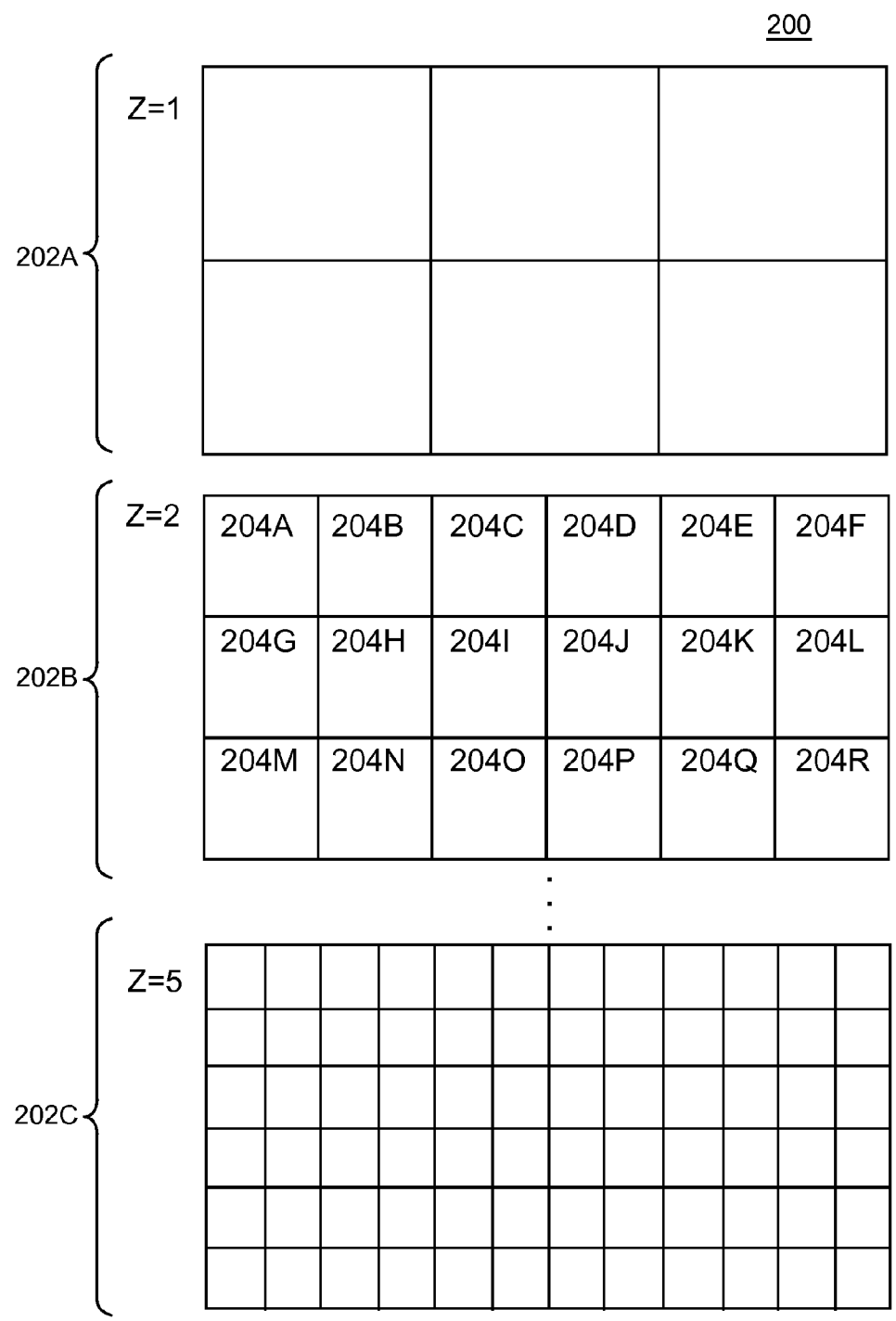
FIG. 3 illustrates a portion of the data structure for the map database of FIG. 1.

Generally speaking, map data in the map database 103 is stored in different zoom levels each formed of a plurality of map data blocks, termed map tiles, which are used to construct a visual display of the map. FIG. 3 illustrates an example data structure 200 of a portion of the map database 103. The map data is stored in numerous (n) different zoom level data structures (only three of which are shown) 202A, 202B, and 202C, where each data structure is formed by a plurality of map data tiles. The data structure 202B, which is the only one numbered for explanation purposes, shows the map data at zoom level, z=2, is formed of 18 map data tiles, 204A-204R. The map tiles represent the basic building blocks for constructing a map display. Each map tile contains necessary map data to construct a portion of the map display, including data identifying roads, buildings, and geographic boundaries, such as water lines, county lines, city boundaries, state lines, mountains, parks, etc. The map data may be stored in any number of different zoom level data structures. In an embodiment, 19 total zoom levels are stored in the map database 103.

The number of tiles at each zoom level increases, e.g., linearly, quadratically, exponentially, or otherwise. The zoom levels in the illustrated example (z=1, 2, and 5) have 6, 18, and 60 map data tiles, respectively, covering the same geographic area or region.

In some embodiments, each map tile contains map data stored in a bitmap format, for display to the user using a raster display engine executed by the display module 184. In other embodiments, the map tile may contain map data stored in vector format, for display using a vector buildup display engine executed by the display module 184. In either case, the display module 184 may employ a C++, HTML, XML, JAVA, or Visual Basic application for generating a visual display of the map tiles.

In the illustrated embodiment, all map data is stored in map tiles, and each map tile in a zoom level data structure is allocated the same memory allocation size. For example, each tile 204A-204R may be a bitmap image at or near 10 Kbytes in size. This may be achieved, for example, by having each map tile cover the same sized geographic area. For map tiles containing vector data, the data size for each tile may vary, but each tile may still, in some embodiments, be allotted the same maximum memory space. Although not illustrated, in other embodiments, the data tiles will have different memory space allocations within a zoom level data structure.

Figure 4A:
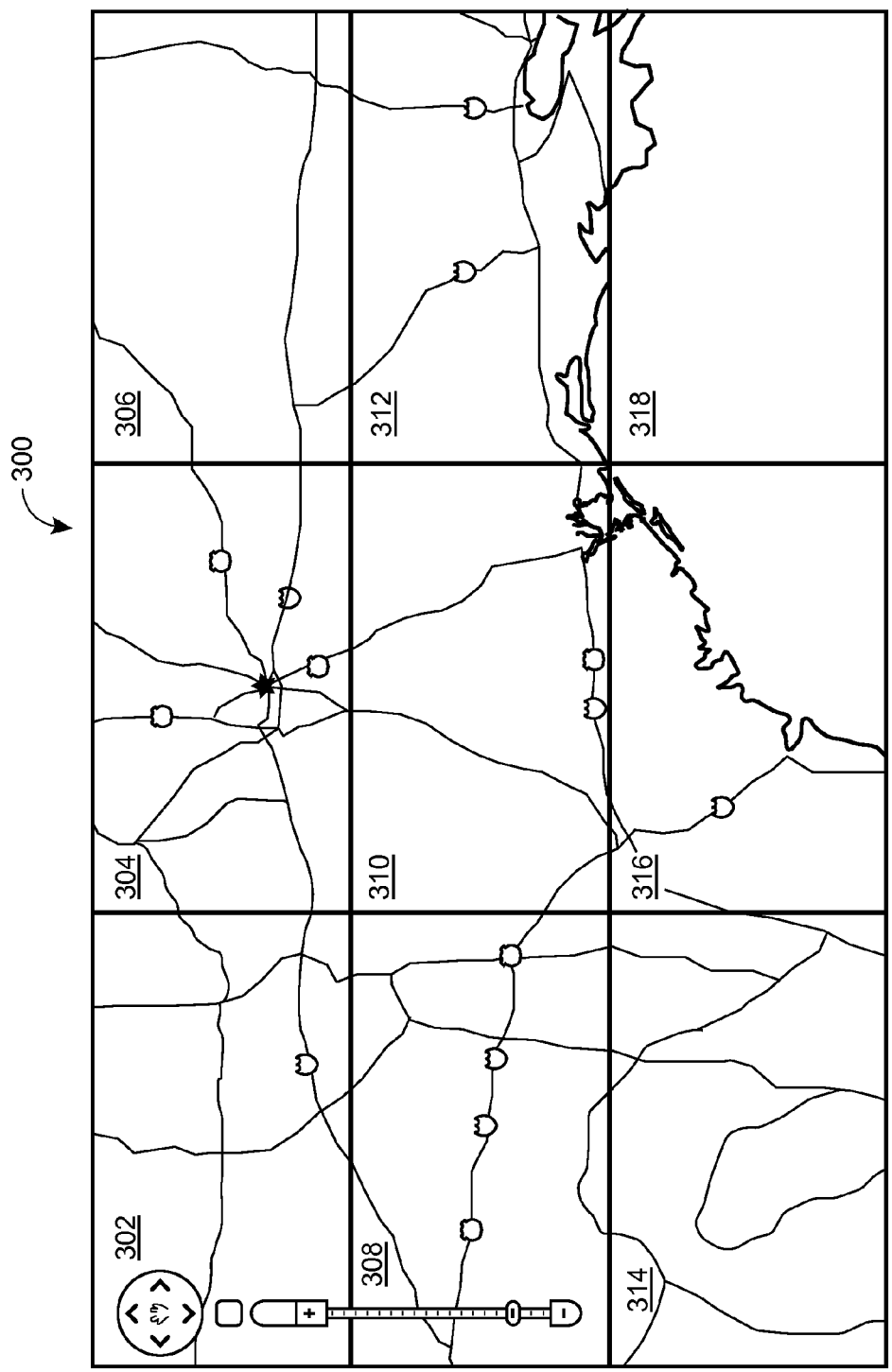
FIGS. 4A, 4B, and 4C illustrate example renditions of map data at three different zoom levels, respectively.
Figure 4B:
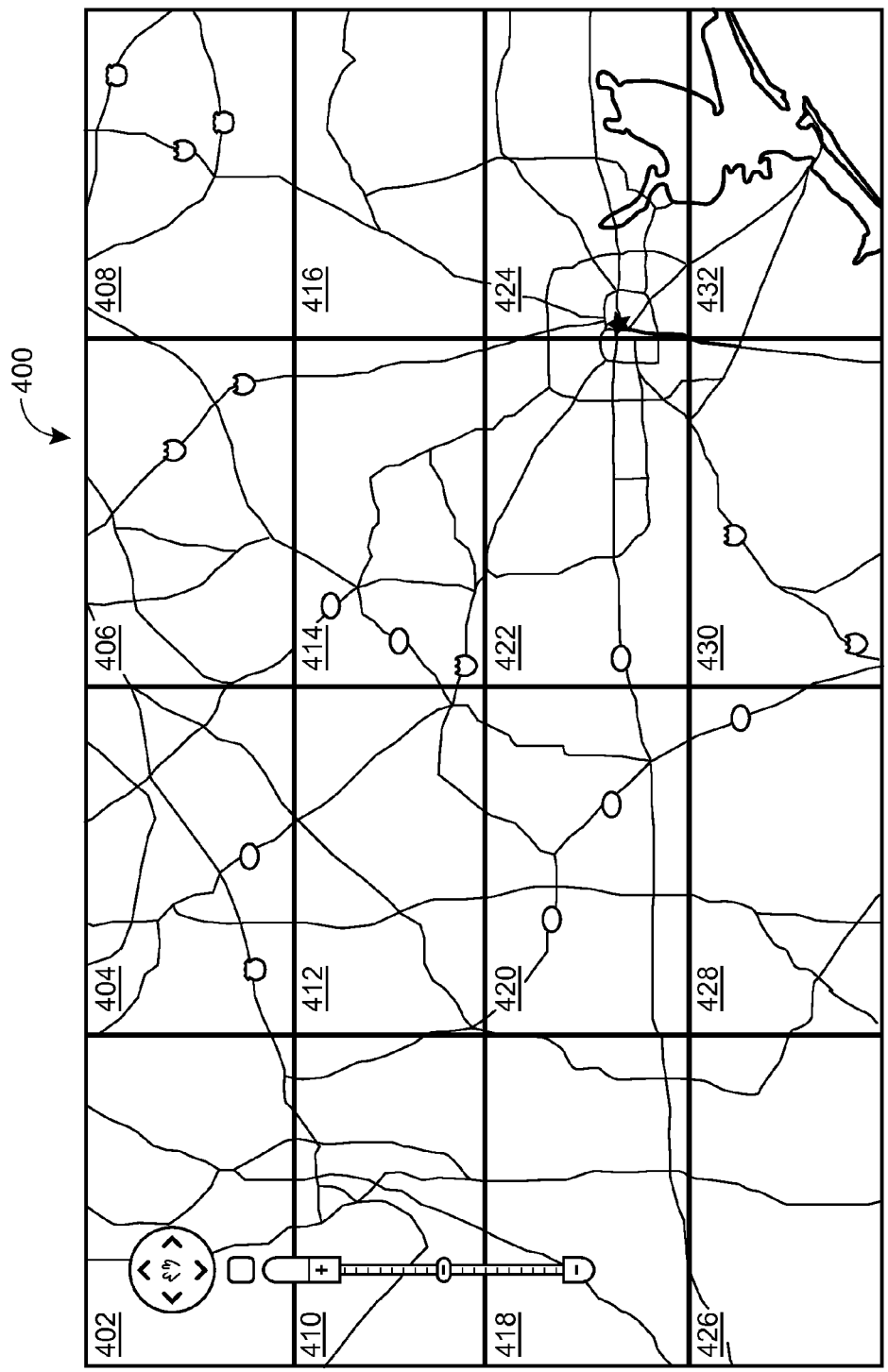
Figure 4C:
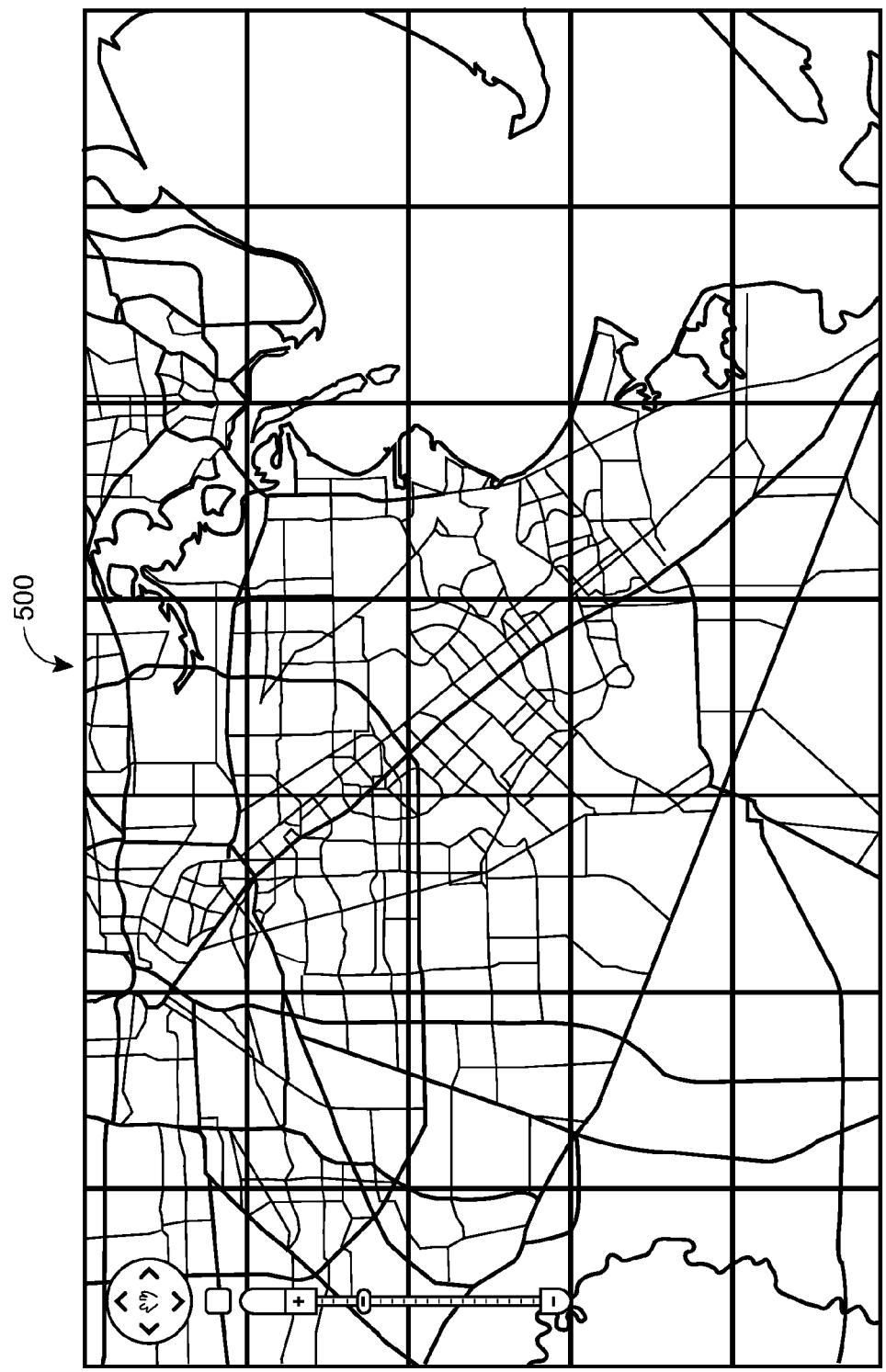

FIGS. 4A-4C illustrate visual map displays, e.g., that may be fully or partially displayed on the user interface 134, where each figure provides a visual display at a different zoom level. In the illustrated embodiments, FIG. 4A provides a visual map display 300 at an example zoom level, z=6, constructed of a series of map tiles 302-318, which cover the same size geographic area and which have the same amount of memory size.

In operation, the server 105 is able to transmit map data to respective clients 115 in chunks of data defined by these map tiles. For example, to transmit the map data needed to construct the map display 300, the server 105 may transmit each map tile in a frame, having a header portion providing identification data of the frame (such as geographic position, client device address, map tile version number, etc.) and a payload portion containing the specific map tile data to be used in forming the visual display. Map data tiles provide an effective mechanism for quantizing map data stored in the map database 103 and for quantizing communication of the map data over the network 125 to the clients 115.

In comparison to FIG. 4A, FIG. 4B illustrates a visual map display 400 at a zoom level higher than the zoom level of FIG. 4A, in this example zoom level, z=10. The map display 400 is formed of a plurality of map tiles 402-432. Like the map tiles 302-318, the map tiles 402-432 are each the same in size, e.g., covering the same geographic area and having the same memory size. FIG. 4C illustrates another visual map display 500 at a third even higher zoom level, zoom level z=12, formed of map data tiles.

Each of the displays 300, 400, and 500 is of a portion of the overall map data, which comprises many more map data tiles.

As illustrated across FIGS. 4A-4C, the map tiles that form each visual map display have various levels of detail. The tiles 302-318 illustrate geographic boundaries, but no roads, only highways and/or interstates, while the tiles of FIG. 4C are at a higher zoom level and contain information on roads, buildings, parks, end points, etc.

As the zoom levels increase, i.e., as the visual map display focuses down on a smaller geographic region, the amount of map data may reach a maximum point, beyond which all zoom levels will contain the same map data. The number of map tiles needed to construct a map display may vary but the total amount of map data becomes saturated. The zoom level corresponding to this point is termed the saturation zoom level and represents the zoom level at which all roads, building, parks, end points, and other map data elements for a geographic region are provided. Any additional zoom levels selected by the user merely zoom in further on these map data elements. In the illustrated example of FIGS. 4A-4C, zoom level, z=12, represents the saturation zoom level.

While a user interacts with the visual map displays 300, 400, and 500, the user may wish to scroll around to display other map data near the illustrated map data. Therefore, the client device 115 uses a system to fetch and store a sufficient amount of map data to form the visual map display while buffering additional map data at the local device 115 to allow efficient user interaction with that display.

Figure 5:
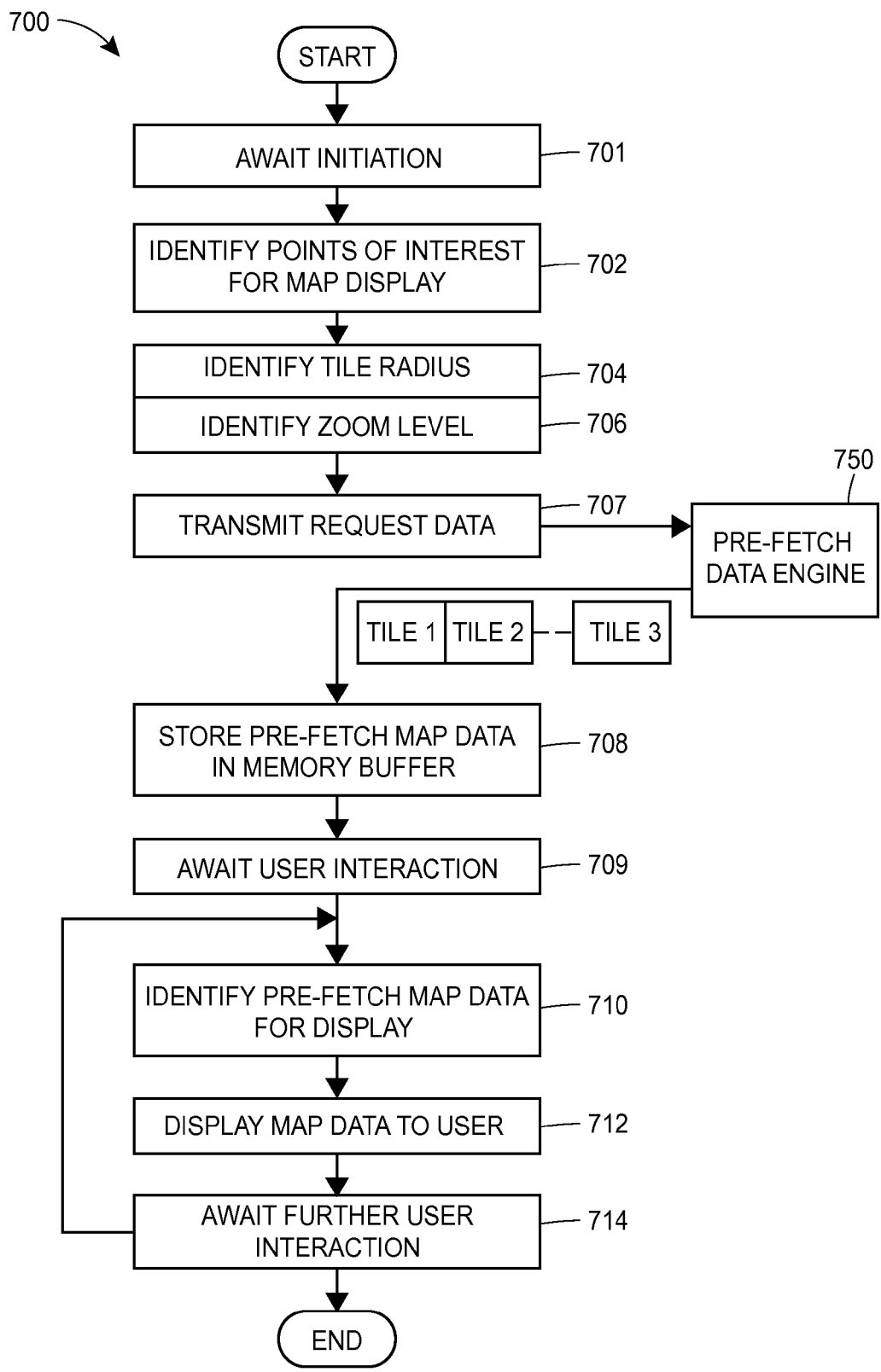
FIG. 5 illustrates an example process or flow diagram for identifying points of interest, map zoom levels, and map tile radii used in identifying pre-fetch map data for constructing a visual map display to a user.

FIG. 5 illustrates a routine or process 700 associated with providing zoom level data (zoom level module 190) and tile radius data (tile radius module 188) to the remote server 105, which responds with pre-fetch map data to the client 115, allowing the client 115 to store map data for subsequent display to the user (display module 184). At a block 701, the routine or process 700 awaits initiation, which may result from user action, such as a user activating a mapping application on the client device 115. Initiation may also result from user or application initiated searches, direction end points, and stored location accesses by a user or application. In some embodiments, the block 701 functions to automatically initiate the routine or process 700, for example, by periodically initiating pre-fetching of map data. The block 701 may be designed to initiate the process every hour, every day, a few times a day, or at any other suitable periodic interval. In some embodiments, that automatic initiation can occur in response to an event unbeknownst to the user of the client device, such as when the client device is turned on, and/or when the client device is identified as being in an entirely new geographic region, such as when a user has traveled to a city location.

At a block 702, the map point identification module 182 automatically (i.e., without user interaction or initiation) determines one or more points of interest to display to a user via the interface 134. The module 182 automatically identifies points of interest, for example, by determining a GPS position of the current location of the client 115, by determining most recently searched points of interest, by accessing a database of stored points of interest, or by determining the most recently visited points of interest (e.g., cities, neighborhoods, etc.). Of course, in some of these cases, the module 182 may determine locations for which to download map data for storage at the user device as a background application and thus without any particular user interaction. An example further implementation of the module 182 and the block 702 is described in FIG. 9 below.

In other examples, the module 182 may manually determine the points of interest based on user input, for example, through the user providing an address into a data field presented on the interface 134, or through the user selecting to find a point of interest obtained through interaction with the interface 134 more generally. For example, the user can access a web-browser or other program running on the client device that identifies a location, business, home, etc., from which the module 182 may allow the user to select such item for building a map display of the vicinity around such point of interest. Any suitable manual method for entering or otherwise identifying one or more points of interest may be used by module 182 and collected by the block 702. These manual methods may have been previously made resulting in stored data that is automatically accessed by the module 182, via the block 702. In other examples, these manual methods may occur contemporaneously with execution of the routine or process 700. Further still, these manual methods can be modified into automatic methods of map point identification, by having the block 702 access historical data on previous, manual user data inputs.

Figure 6:
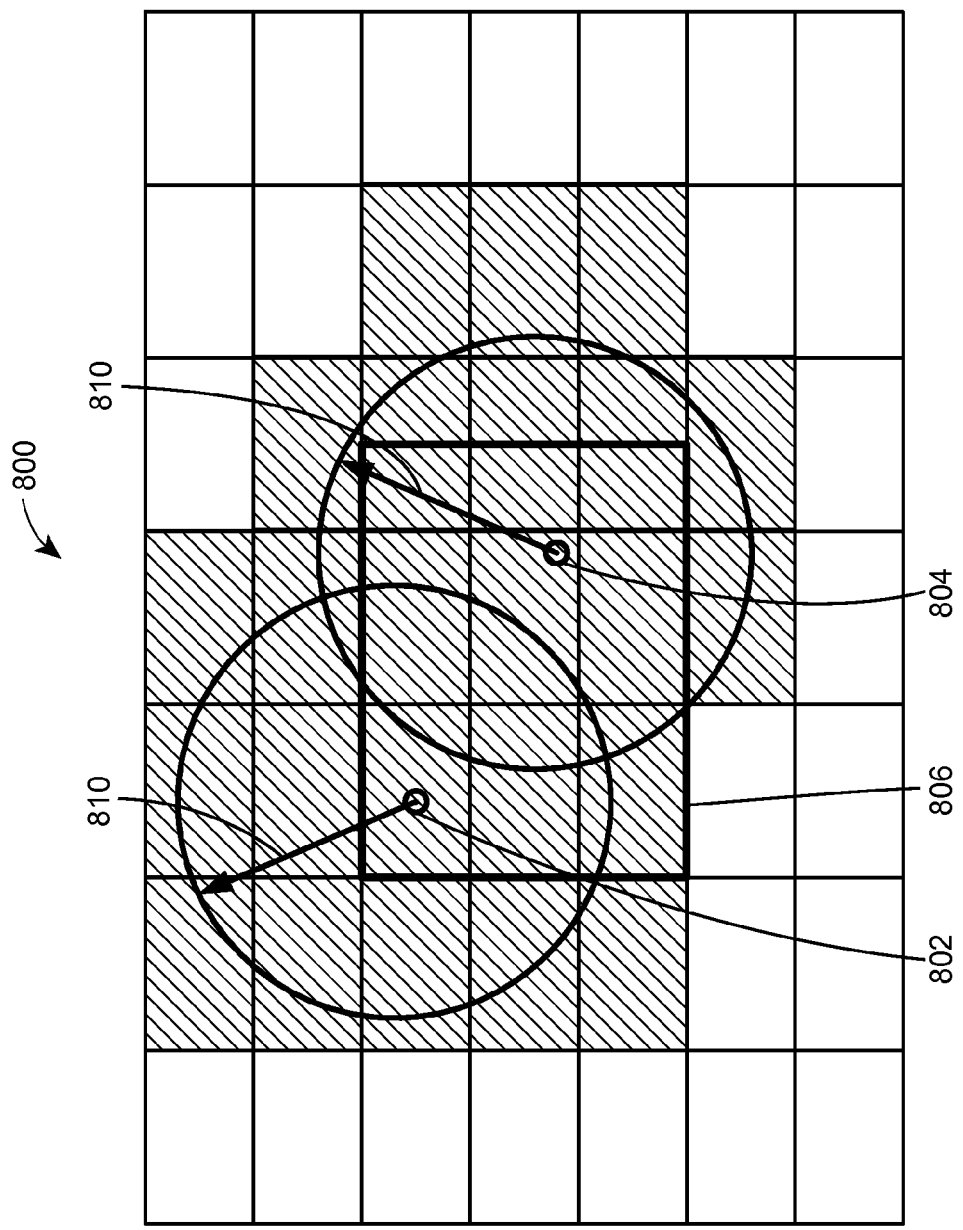
FIGS. 6 and 7 illustrate map data tiles, including identified pre-fetch map data tiles at two different zoom levels, respectively, showing variable tile radii at each zoom level.
Figure 7:
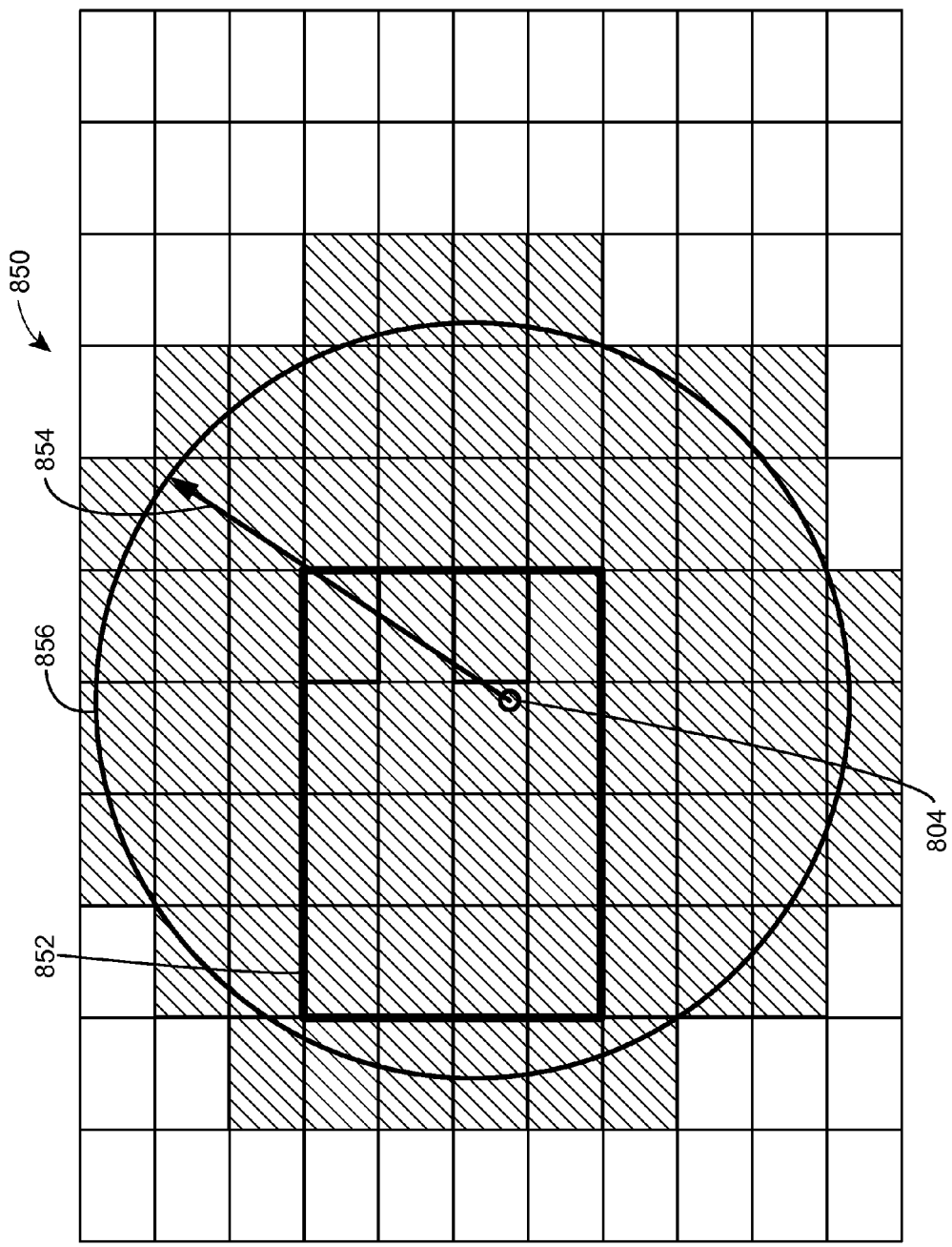

FIG. 6 illustrates an example visual map display 800 showing a portion of available map data stored in the map database 103, at a first (arbitrary) zoom level. FIG. 7 illustrates an example visual map display 850 of a portion of the same map data but at a second, higher zoom level. Two points of interest 802, 804 (identified through block 702) are shown in FIG. 6. Also shown is an outline 806 indicating a region over which the client device 115 would display these two points of interest and the adjacent map data tiles on the user interface 134. In usage, this outline 806 would move as the user seeks to scroll around over the available map data. Because FIG. 7 is at a higher zoom level, an outline 852 only includes point of interest 804.

Returning to FIG. 5, at a block 704, a map tile radius is determined by the map radius module 188. The tile radius represents a radial distance from the point of interest for identifying tiles to fetch from the map database 103. In FIG. 6, a tile radius 810 for the points of interest 802 and 804 is shown. In FIG. 7, a tile radius 854 for the point of interest 804 is shown. As shown, in some embodiments, the identified tile radius, $R_z$, changes with zoom level, z, where for example, for the zoom level in FIG. 6 the tile radius ($R_z$) is $R_4=1$, and in FIG. 7 the tile radius $R_{10}=3$. For explanation purposes, the tile radius 854 will be described.

The tile radius 854, in FIG. 7, extends from the point of interest 804 to identify a plurality of map data tiles associated with the point of interest because they fall within a circumference region 856 defined by the identified tile radius, R. In the illustrated embodiment, this region 856 defines the set of pre-fetch map data tiles that are to be identified by the server 105 from the map database 103 and sent to the client device 115. In one example, any map data tile overlapping evenly partially with the circumference region 856 will be within the set of pre-fetch map data tiles. These tiles are marked shaded in FIG. 7 (and in FIG. 6).

Figure 8:
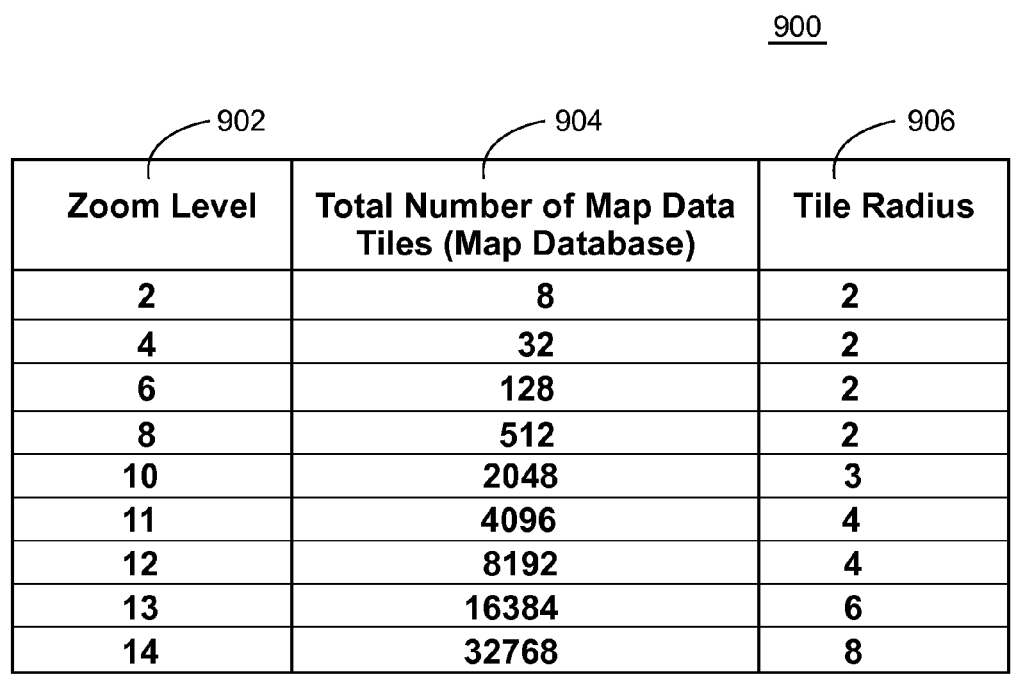
FIG. 8 illustrates an example data table for determining the tile radius as a function of zoom level.

To identify the tile radius, at a block 704, the tile radius module 188 accesses a lookup table of tile radius values for each of the zoom levels (z=1 . . . z=n), where an example lookup table 900 is illustrated in FIG. 8 depicting three data columns. Column 902 identifies corresponding zoom levels stored in the map database 103; column 904 identifies the total number of map data tiles stored at each zoom level; and column 906 identifies stored tile radii values for each of the corresponding zoom levels. In the illustrated example, the lookup table 900 identifies tile radii for some, but not all zoom level data structures stored in the map database. Tile radii are provided for z=2, 4, 6, 8, 10, 11, 12, 13, and 14. For the other zoom level data stored in the map database, the client device 115 may not request pre-fetching tiles. It is also noted that zoom level 14 may represent the saturation zoom level in the map database 103. In any event, the tile radii values may represent arbitrary numerical values extending from a point of interest or they may represent a number of tiles, measured along a diagonal, for example from tile center to tile center along a diagonal. The number of pre-fetch map data tiles captured within the circle of interest defined by the corresponding tile radius, will change with size of the radius. For example, assuming no overlapping circles of interest, R=1 will capture 9 map data tiles, while R=2 will capture 25 map data tiles. The lookup table 900 is stored in the memory buffer 180. The tile radii change with zoom levels and may change gradually over the zoom levels, where some zoom levels share the same tile radius. In other examples, the tile radii values change more aggressively. The tile radii values may progress across the zoom levels linearly, quadratically, exponentially or otherwise.

Furthermore, the tile radius values 906 may be fixed and held constant. In other examples, the tile radius module 188 changes the tile radii, for example, in response to user preferences or usage patterns stored, or in response to a tile radius data update request from the server 105. For example, the tile radius module 188 may access a usage profile database stored in a portion of the memory 132 and that contains data on recent interactions with a visual map display on the user interface, e.g., the amount of scrolling a user has done, the amount of scale changing the user does, etc., from which the module 188 determines if radii values for one or more of the zoom levels should be changed. In this way, the tile radius values can be changed dynamically, based on usage patterns of the user.

Figure 9:
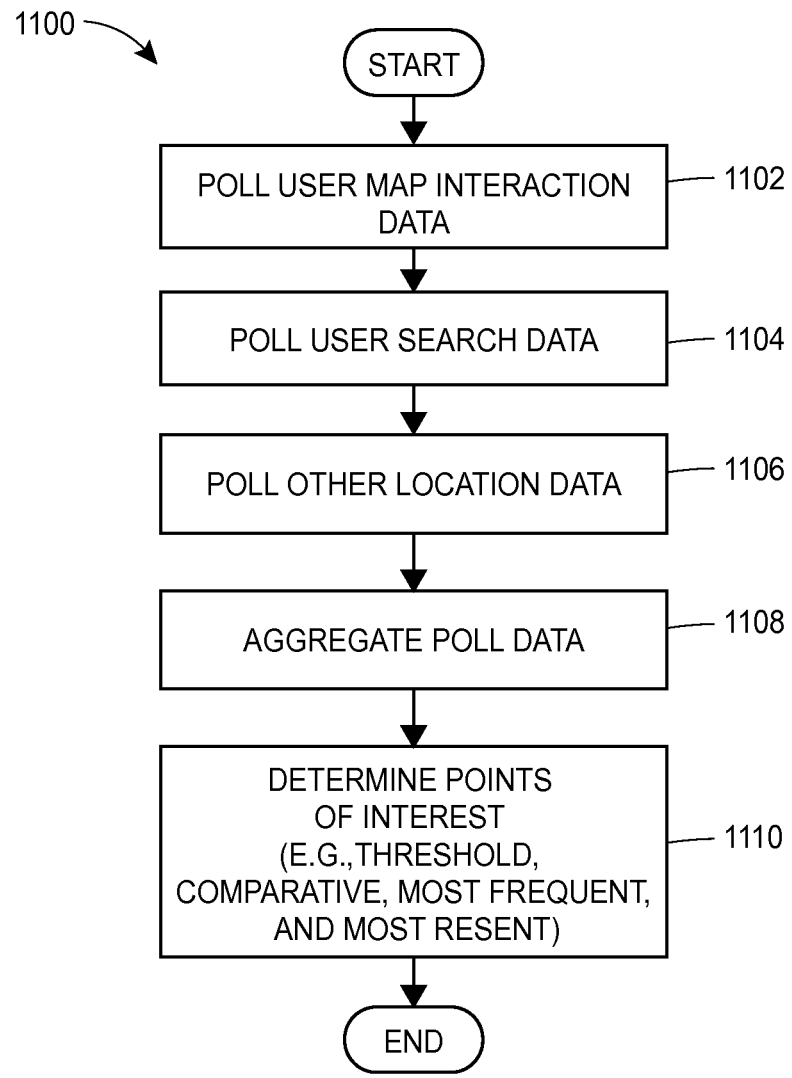
FIG. 9 illustrates an example process or flow diagram for determining points of interest to be used in identifying the pre-fetch map data.

In the illustrated example of FIG. 9, zoom level, z=14 is the saturation zoom level. Below this zoom level the number of map data tiles is fixed, as the tile radius. In other examples, the tile radius may be different for each zoom level. Furthermore, while the tile radius increases with zoom level, in other examples, the tile radius may increase over a portion of the zoom levels and then plateau, as shown, or decrease in value.

The routine or process 700 may identify a plurality of radii, one for each of an identified number of desired zoom levels, which is desirable when the client 115 will act to request pre-fetch map data over a plurality of zoom levels from the server 105. In other examples, the block 704 will identify a single radius corresponding to a single zoom level. In either case, at a block 706, the one or more desired zoom levels are identified (by map zoom module 190).

At a block 707, the database interface module 181 communicates the points of interest (block 702), the tile radius data (block 704), and the zoom level data (block 706) to the server 105, in particular, in the illustrated embodiment, to a pre-fetch module 750 at the server 105. For example, the block 707 may request pre-fetch map data for all map points of interest at one time, for example, by sending to the server a data frame having an identification header that contains, among other things, an identification field identifying the client device and having a payload that identifies the one or more map points of interest and the zoom level or zoom levels for which to collect map data. The map points of interest may be identified by a longitude and latitude coordinate, in some embodiments. The pre-fetch module 750 is able to identify the one or more points of interest and the tile data within the tile radius of those points of interest, at each requested zoom level, to define the overall map data to be fetched from the map database 103. That is, for a request for zoom level, z=10, the pre-fetch module 750 would identify the shaded map data tiles of FIG. 7 from among the entire map database, for a zoom level, z=4, the shaded map data tiles of FIG. 6 would be identified.

The module 750 collects the pre-fetch map tiles and transmits them to the map generator 120, which stores that pre-fetch map data, through a block 708 (database interface module 181), in the memory buffer 190.

The routine or process 700 maintains the entire pre-fetch map data from the server 105 in the memory buffer 180. Optionally, at a block 709, the client device 115 awaits some user interaction, i.e., a subsequent interaction after the pre-fetching of blocks 701-708. Once as user as performed an interaction that is to result in rendering (i.e., construction and display) of a visual map display, a block 710 identifies an initial subset of the previously-stored pre-fetch map data to display to the user on a visual display, in response to the user interaction. FIGS. 6 and 7 illustrate the pre-fetch map data tiles (shaded) that are to be stored on the client device. The initial subset of pre-fetch map data to be displayed corresponds to those tiles within display regions 806 and 852, respectively. The remainder of the pre-fetch map data is maintained in the memory buffer 180 and only displayed to the user in response to scrolling actions from the user. The display module 184 then displays the visual map display at block 712.

At a block 714, the routine or process 700 detects further user interactions with the interface 134, waiting for the user to interact with the visual display of map data as the user selects different regions of the map data that should be displayed. For example, the block 714 detects a user scrolling across the displayed map data as the user attempts to display adjacent map data to the initial point of interest. Such scrolling may be sideways across the display, up or down, or any other desired direction. The user may also choose to alter the map by changing zoom levels, either increasing to zoom in further on the map data or decreasing to zoom further out. The block 714 identifies map manipulation user interaction data to the block 710, which then determines which new pre-fetched map data is to be displayed in response to the user interaction. Or the block 714, upon appropriate instruction from the user, terminates the routine or process 700 entirely, for example, when a user selects to exit a mapping application.

The blocks 709-714 are optional. And furthermore, instead of awaiting user interaction, these blocks may be designed to automatically performing the pre-fetch map data identification and visual map display rendering.

FIG. 9 illustrates a routine or process 1100 for automatically determining (prior to user interaction or initiation) points of interest as may be used by block 702. The map point identifier module 182 performs a series of data polling operations, accessing data stored in the memory 132 to aggregate one or more potential points of interest. At a block 1102, the module 182 polls current user interaction data or stored user map interaction data, such as data on past user interactions with map data displayed on the interface 134, including data such as locations highlighted by the user, map points placed on a map display by the user, and geographic regions most displayed on a map display, which is stored in the memory 132. At a block 1104, the module 182 polls data on user searches, identifying locations requested for identification by the user, and which are stored on the memory 132. At a block 1106, the module 182 polls any other stored location data, including current geographic position and stored geographic position. The latter includes data such as tracking data for geographic position of the client device 115, to automatically determine location patterns. For example, the module 182 may collect data on client device location during the traditional workweek, Monday-Friday, and use that data for pre-fetching map data corresponding to typical travel patterns of the client device during the workweek. While the module 182 may collect different data to determine different typical travel patterns, and thus different potential points of interest, during the weekend. It is noted that these examples are described in terms of points of interest, but as used herein, a point of interest represents a particular point on a map or any region of a map that can be defined (specifically or even generally) by map data. That is a point of interest refers to map locations or region that may be displayed to the user through map data.

At a block 1108, the module 182 aggregates the polled potential points of interest data and provides this data to a block 1110, where the module 182 determines a set of one or more points of interest to be used by block 704 to determine the corresponding one or more tile radii.

The block 1110 may determine the points of interest by using a threshold, for example, identifying any points of interest that have been accessed by the user a certain number of times or a certain percentage of time over a given period of time. The block 1110 may determine the points of interest comparatively, for example, by determining which points of interest are the most frequently accessed. The block 1110 may make the determination based on which points of interest are most recently accessed.

Figure 10:
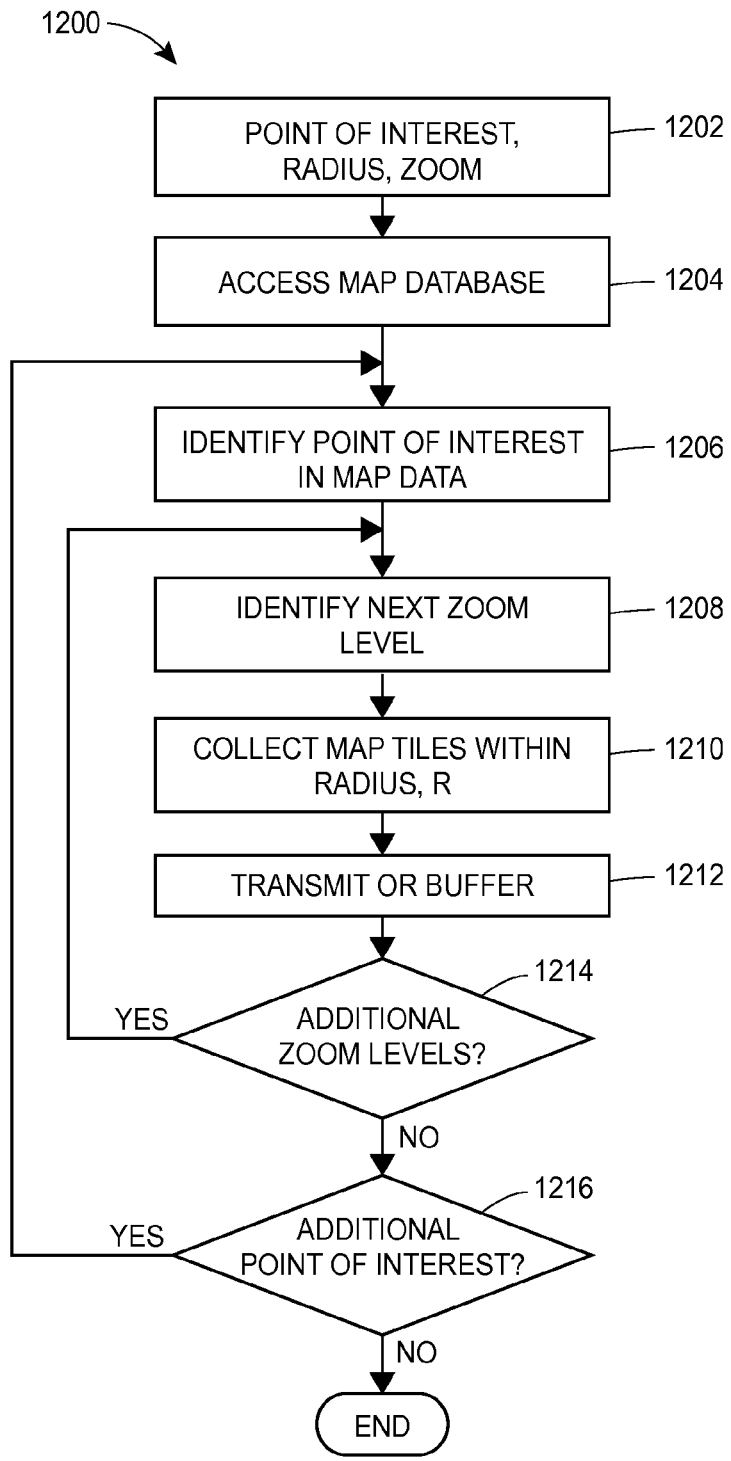
FIG. 10 illustrates an example process or flow diagram for identifying the pre-fetch map data in response to the identified points of interest, zoom levels, and map tile radii.

FIG. 10 illustrates an example routine or process 1200 as may be performed by the server 105, specifically the pre-fetch module 750, upon receipt of the identified points of interest, zoom levels, and tile radii at a block 1202, e.g., from the database interface module 181. At a block 1204, the server 105 accesses the map database 103 and takes one of the points of interest and identifies the map data corresponding to that point of interest, at a block 1206. A block 1208 identifies a zoom level, e.g., from the zoom level received to block 1202, at which to collect the initial set of map data from the database 103. For the identified zoom level, a block 1210 identifies the first point of interest collects all tiles within a tile radius of that point of interest, which thereby identifies the pre-fetch map data associated with the point of interest. For example, if each tile in the map data is stored with an assigned position value relative to the other tiles, such as an assigned longitude value and an assigned latitude value or an assigned column value and an assigned row value. Then the block 1210 determines a difference value between each map tile and the map tile containing the point of interest to identify, which tiles will be in the set of pre-fetch map data sent to the client device 115. More specifically, however, the block 1210 will determine the map tiles by determining which tiles are within a radius distance from the exact geographic location of the point of interest within its corresponding map tile. In this way, the block 1210 is able to compensate for points of interest that are not in the middle of a map tile, such as point of interest 804, but rather are closer to one of the sides or corners of a map tile.

At a block 1212, the server 105 transmits the pre-fetch map data collected at block 1210 to the requesting client device 115, where the requesting client device 115 is identified by address information in a header of the data provided to block 1202. In other embodiments, the block 1212 does not immediately transmit the pre-fetch map data but rather buffers that map data in a memory at the server 105 for subsequent transmission, along with any additional pre-fetch map data.

In the illustrated embodiment, at a block 1214, the server 105 determines if the client device has identified a need for map data stored at additional zoom levels, where if so, control is passed back to the block 1208 which identifies the next zoom level and the process repeats, as described. If no additional zoom level data is required for the particular point of interest, then a block 1216 determines if additional points of interest have been identified by the client device, where if so, control is passed back to the block 1206 which identifies the next point of interest and the process repeats, as described.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 125 may include but is not limited to any combination of a LAN, a MAN, a WAN, a mobile, a wired or wireless network, a private network, or a virtual private network. Moreover, while only three clients 115 are illustrated in FIG. 1 to simplify and clarify the description, it is understood that any number of client computers are supported and can be in communication with the server 105.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmissions (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
identifying, on a client device, a map point of interest;
identifying, from a plurality of zoom levels, one or more zoom levels for use in identifying map data for storage on the client device, where the map data is to be stored on the client device at different zoom levels, each zoom level containing a respective set of map data tiles;
identifying a different tile radius for each of the one or more determined zoom levels, where each tile radius corresponds to the map point of interest and defines, for each of the one or more zoom levels, pre-fetch map data tiles to be requested from a remote map database and stored on the client device for eventual rendering of the visual display in response to a subsequent user request;
requesting, from the remote map database, the pre-fetch map data tiles, wherein the map database stores map data in the form of a plurality of map data tiles, and the pre-fetch map data tiles are a sub-set of the plurality of map data tiles; and
receiving and storing the pre-fetch map data tiles in a local memory on the client device;
wherein the tile radius varies across different zoom levels in the map database and identifying a different tile radius for each of the one or more determined zoom levels comprises accessing tile radius data from a lookup table.

2. The method of claim 1, wherein the map data at each zoom level is stored in map tiles having the same memory allocation size.

3. The method of claim 1, wherein identifying a different tile radius for each of the one or more determined zoom levels comprises adjusting the tile radius based on usage patterns of the user interacting with a previous visual display of the map data.

4. The method of claim 1, the method further comprising:
communicating the one or more determined zoom levels and the identified tile radius at each of the one or more determined zoom levels to a remote server connected to the client device through a communication network, where the remote map database is stored on the remote server;

the remote server accessing the remote map database to identify the pre-fetch map data tiles, in response to the communicated one or more zoom levels, the determined tile radius at each of the one or more zoom levels, and the map point of interest; and the remote server communicating the identified pre-fetch map data tiles to the client device through the communication network.

5. The method of claim 1, wherein the number of zoom levels is n, wherein n is an integer greater than 1, and each zoom level contains a different amount of geographic detail.

6. The method of claim 1, wherein identifying the map point of interest comprises automatically determining the map point of interest based on a user's usage data, a threshold analysis of a plurality of potential points of interest, most recently accessed points of interest, and/or most frequently accessed points of interest.

7. The method of claim 1, further comprising:
awaiting a user initiated request for a visual display of map data; and
rendering the visual display from a subset of the pre-fetch map data tiles stored in the local memory.

8. A non-transitory computer-readable medium storing instructions, the instructions when executed by a processor cause the processor to:
identify, on the client device, a map point of interest;
identify, from a plurality of zoom levels, one or more zoom levels for use in identifying map data for storage on the client device, where the map data is to be stored on the client device at different zoom levels, each zoom level containing a respective set of map data tiles;
identify a different tile radius for each of the one or more determined zoom levels, where each tile radius corresponds to the map point of interest and defines, for each of the one or more zoom levels, pre-fetch map data tiles to be requested from a remote map database and stored on the client device for eventual rendering of the visual display in response to a subsequent user request;
request, from the remote map database, the pre-fetch map data tiles, wherein the map database stores map data in the form of a plurality of map data tiles, and the pre-fetch map data tiles are a sub-set of the plurality of map data tiles;
receive and store the pre-fetch map data tiles in a local memory on the client device; and
access tile radius data from a lookup table.

9. The non-transitory computer-readable medium storing instructions of claim 8, wherein the map data at each zoom level is stored in map tiles having the same memory allocation size.

10. The non-transitory computer-readable medium storing instructions of claim 8, wherein the tile radius varies across different zoom levels in the map database.

11. The non-transitory computer-readable medium storing instructions of claim 8, wherein the instructions, when executed by a processor, cause the processor to adjust the tile radius based on usage patterns of the user interacting with a previous visual display of the map data.

12. The non-transitory computer-readable medium storing instructions of claim 8, wherein the instructions, when executed by a processor, cause the processor to communicate the one or more determined zoom levels and the determined tile radius at each of the one or more determined zoom levels to a remote server connected to the client device through a communication network, where the remote map database is stored on the remote server.

13. The non-transitory computer-readable medium storing instructions of claim 8, wherein the instructions, when executed by a processor, cause the processor to automatically determine the map point of interest based on a user's usage data, a threshold analysis of a plurality of potential points of interest, most recently accessed points of interest, and/or most frequently accessed points of interest.

14. The non-transitory computer-readable medium storing instructions of claim 8, wherein the instructions, when executed by a processor, cause the processor to:
await a user initiated request for a visual display of map data; and
render the visual display from a subset of the pre-fetch map data tiles stored in the local memory.

15. A computer system for fetching map tile data to be used in constructing a visual display of map data on a client device, the computer system comprising:
a map point identifier module that identifies a map point of interest;
a zoom level module that identifies one or more zoom levels for use in identifying map data for storage on the client device, where the map data is to be stored on the client device at different zoom levels, each zoom level containing a respective set of map data tiles;
a map tile radius module that determines a different tile radius for each of the one or more determined zoom levels, where each tile radius corresponds to the map point of interest and defines, for each of the one or more zoom levels, pre-fetch map data tiles to be requested from a remote map database and stored on the client device for eventual rendering of the visual display in response to a subsequent user request; and
a database interface module to receive, from the map database, the pre-fetch map data tiles corresponding to the map point of interest and to store the pre-fetch map data tiles in a local memory on the client device;
wherein the map tile radius module determines the tile radius associated with each zoom level by accessing tile radius data from a lookup table.

16. The computer system of claim 15, where the map data at each zoom level is stored in map tiles having the same memory allocation size.

17. The computer system of claim 15, where the tile radius varies across different zoom levels in the map database.

18. The computer system of claim 15, wherein the map tile radius module determines the tile radius associated with the map point of interest by adjusting the tile radius based on usage patterns of a user interacting with a previous visual display of the map data.

19. The computer system of claim 15, wherein the database interface module communicates the map point of interest, the one or more determined zoom levels, and the tile radius at each of the one or more determined zoom levels to a remote server connected to the client device through a communication network, where the remote map database is stored on the remote server.

20. The computer system of claim 15, wherein the map point identifier module automatically determines the map point of interest based on a user's usage data, a threshold analysis of a plurality of potential points of interest, most recently accessed points of interest, and/or most frequently accessed points of interest.

21. The computer system of claim 15, wherein the map tile radius increases with zoom level.

22. The computer system of claim 15, wherein the map tile radius is the same for at least two zoom levels.

\* \* \* \* \*